US012547089B2

(12) United States Patent
Kawaguchi et al.

(10) Patent No.: US 12,547,089 B2
(45) Date of Patent: Feb. 10, 2026

(54) TONER AND TONER PRODUCTION METHOD

(71) Applicant: CANON KABUSHIKI KAISHA, Tokyo (JP)

(72) Inventors: Shintaro Kawaguchi, Kanagawa (JP); Masatake Tanaka, Kanagawa (JP); Taiji Katsura, Shizuoka (JP); Dai Nozaki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 541 days.

(21) Appl. No.: 18/173,357

(22) Filed: Feb. 23, 2023

(65) Prior Publication Data

US 2023/0273536 A1 Aug. 31, 2023

(30) Foreign Application Priority Data

Feb. 28, 2022 (JP) ................................. 2022-028817

(51) Int. Cl.
*G03G 9/097* (2006.01)
*G03G 9/08* (2006.01)
*G03G 9/107* (2006.01)

(52) U.S. Cl.
CPC ......... *G03G 9/0821* (2013.01); *G03G 9/0827* (2013.01); *G03G 9/10882* (2020.08)

(58) Field of Classification Search
None
See application file for complete search history.

(56) References Cited

U.S. PATENT DOCUMENTS

2017/0315461 A1* 11/2017 Komatsu ............ G03G 9/08795

FOREIGN PATENT DOCUMENTS

JP 2007140368 A 6/2007

* cited by examiner

*Primary Examiner* — Peter L Vajda
(74) *Attorney, Agent, or Firm* — Canon U.S.A., Inc. IP Division

(57) ABSTRACT

The subject toner includes a toner particle containing a binding resin and an inorganic oxide particle, wherein the inorganic oxide particle is a particle of an oxide containing at least one element selected from the group consisting of: Si; Mg; Al; Ti; and Sr, wherein, when an area of the inorganic oxide particle is represented by Sm and a sectional area of the toner is represented by St in a cross-section of the toner observed with a transmission electron microscope, Sm/St is 4.0% or more, wherein an area Sm of the inorganic oxide particle that occupies each of four regions obtained by dividing the cross-section of the toner by a long diameter of the toner and a perpendicular bisector of the long diameter has a standard deviation of 0.40 or more in the observed cross-section, and wherein the toner has an average circularity of 0.950 or more.

14 Claims, 4 Drawing Sheets

TONER AND TONER PRODUCTION METHOD

BACKGROUND

Field of the Disclosure

The present disclosure relates to a toner used in a recording method utilizing electrophotography or the like, and a toner production method.

Description of the Related Art

In recent years, the environment of an electrophotographic apparatus such as a desktop printer has been changed from an environment in which one apparatus is shared by a plurality of people to an environment in which one apparatus is used by each person, and a further improvement in image quality and downsizing have been demanded at the same time.

One effective way of downsizing a process cartridge is to adopt a cleaner-less system. Most printers each adopt a cleaner system, and in a transfer step, a toner remaining on an electrostatic latent image-bearing member (hereinafter referred to as "transfer residual toner") is scraped off the electrostatic latent image-bearing member by a cleaning blade and collected in a waste toner box.

In contrast, the cleaner-less system can significantly contribute to the downsizing of a main body because there is no such cleaning blade or waste toner box.

Meanwhile, along with the worldwide spread of printers, the types of paper to be used have been diversified. When, in particular, paper having low strength or paper containing a large amount of a loading material out of those types is used, so-called "paper dust" tends to be liable to be generated in a large amount along with printing.

This paper dust tends to cause various problems in the cleaner-less system.

In particular, in a transfer system in which a toner is directly transferred from a photosensitive member onto paper, the photosensitive member and the paper are brought into direct contact with each other. In this case, paper dust is liable to adhere onto the photosensitive member. The paper dust adhering onto the photosensitive member is collected together with the transfer residual toner by the cleaning blade in the cleaner system. However, in the cleaner-less system, the paper dust is returned to a charging step and a developing step together with the transfer residual toner without being collected, and hence various image defects are liable to occur.

In order to suppress such adhesion of the paper dust to the surface of the photosensitive member as described above, it is effective to reduce a transfer current applied in the transfer step. However, when the transfer current is reduced, the transfer efficiency is liable to be reduced.

In order to improve the transfer efficiency, in Japanese Patent Application Laid-Open No. 2007-140368, an attempt has been made to subject a pulverized toner containing a silica aggregate to heating spheronization treatment.

However, it has been found that the technology described in Japanese Patent Application Laid-Open No. 2007-140368 described above is not sufficient for achieving both of transferability and a cleaning property at a high level when the speed of an electrophotographic apparatus is further increased and the life thereof is further extended. It has been found that, in particular, in the cleaner-less system, there is a problem in terms of the achievement of both the transferability and the cleaning property.

SUMMARY

The present disclosure provides a toner that has solved the above-mentioned problem. Specifically, the present disclosure provides a toner capable of achieving both the transferability and the cleaning property at a high level when the speed is increased and the life is extended. The inventors of the present disclosure have repeatedly made extensive investigations, and as a result, have found that the above-mentioned problem can be solved by the toner described below, to thereby complete the present disclosure.

That is, the present disclosure relates to a toner including a toner particle containing a binding resin and an inorganic oxide particle, wherein the inorganic oxide particle is a particle of an oxide containing at least one element selected from the group consisting of: Si; Mg; Al; Ti; and Sr, wherein, when an area of the inorganic oxide particle is represented by Sm and a sectional area of the toner is represented by St in a cross-section of the toner observed with a transmission electron microscope, Sm/St is 4.0% or more, wherein an area Sm of the inorganic oxide particle that occupies each of four regions obtained by dividing the cross-section of the toner by a long diameter of the toner and a perpendicular bisector of the long diameter has a standard deviation of 0.40 or more in the observed cross-section, and wherein the toner has an average circularity of 0.950 or more.

The present disclosure also relates to a toner production method for producing a toner including a toner particle containing a binding resin and an inorganic oxide particle, the production method including obtaining the toner particle, wherein the obtaining the toner particle includes obtaining a pre-hot-air surface treatment toner particle and subjecting the pre-hot-air surface treatment toner particle to surface treatment with hot air, wherein the obtaining a pre-hot-air surface treatment toner particle includes melting and kneading the binding resin and the inorganic oxide particle, wherein the inorganic oxide particle is a particle of an oxide containing at least one element selected from the group consisting of: Si; Mg; Al; Ti; and Sr, wherein, when an area of the inorganic oxide particle is represented by Sm and a sectional area of the toner is represented by St in a cross-section of the toner observed with a transmission electron microscope, Sm/St is 4.0% or more, wherein an area Sm of the inorganic oxide particle that occupies each of four regions obtained by dividing the cross-section of the toner by a long diameter of the toner and a perpendicular bisector of the long diameter has a standard deviation of 0.40 or more in the observed cross-section, and wherein the toner has an average circularity of 0.950 or more.

Further features of the present disclosure will become apparent from the following description of exemplary embodiments with reference to the attached drawings.

DESCRIPTION OF THE EMBODIMENTS

Figure 1:
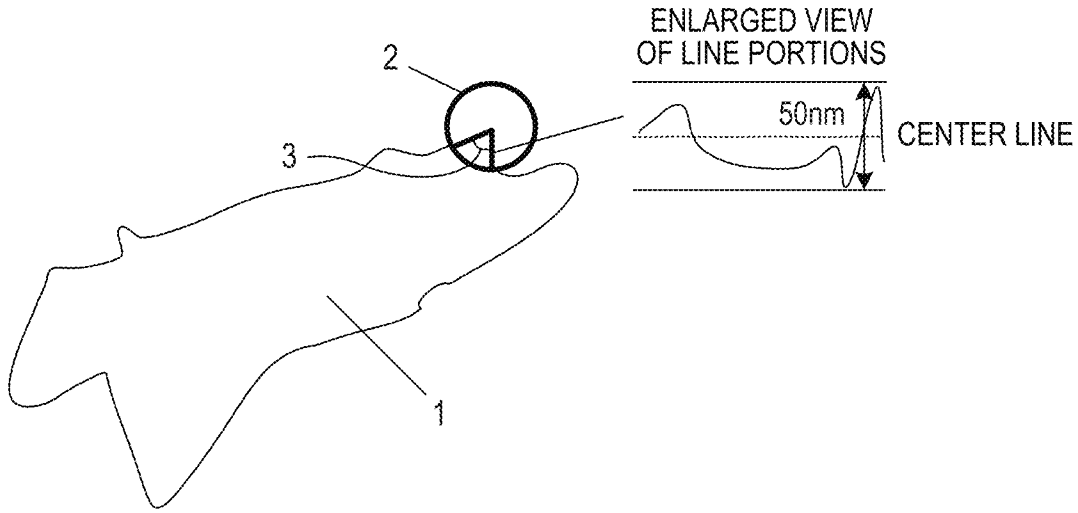
FIG. 1 is a view for illustrating a pointed portion.

The present disclosure is described in detail below, but is not limited to the following embodiments.

FEATURES OF PRESENT DISCLOSURE

That is, the present disclosure relates to a toner including a toner particle containing a binding resin and an inorganic oxide particle, wherein the inorganic oxide particle is a particle of an oxide containing at least one element selected from the group consisting of: Si; Mg; Al; Ti; and Sr, wherein, when an area of the inorganic oxide particle is represented by Sm and a sectional area of the toner is represented by St in a cross-section of the toner observed with a transmission electron microscope, Sm/St is 4.0% or more, wherein the area Sm of the inorganic oxide particle that occupies each of four regions obtained by dividing the cross-section of the toner by a long diameter of the toner and a perpendicular bisector of the long diameter has a standard deviation of 0.40 or more in the observed cross-section, and wherein the toner has an average circularity of 0.950 or more.

The inventors of the present disclosure have conceived the reason why the effects of the present disclosure are obtained by satisfying the above-mentioned conditions to be as described below.

As a way of improving the transferability of a toner, the adhesive force of the toner has hitherto been reduced by increasing the circularity thereof. Meanwhile, when the circularity is increased, the rolling property thereof is increased. As a result, there has been a problem of the deterioration of the cleaning property of the toner.

In contrast, the inventors have conceived that, in the present disclosure, the above-mentioned problem can be solved by such a mechanism as described below. When an inorganic oxide particle containing at least one element selected from the group consisting of: Si; Mg, Al; Ti; and Sr is incorporated into a toner having a high circularity, a difference in specific gravity is caused between an organic component and an inorganic component in the toner. When the area of the inorganic oxide particle is represented by Sm, and the sectional area of the toner is represented by St in a cross-section of the toner observed with a transmission electron microscope, Sm/St is 4.0% or more. The area Sm of the inorganic oxide particle that occupies each of four regions obtained by dividing the cross-section of the toner by a long diameter of the toner and a perpendicular bisector of the long diameter has a standard deviation of 0.40 or more in the observed cross-section. With this configuration, bias is caused in the difference in specific gravity between the organic component and the inorganic component in the toner, and the center of gravity of the toner is biased. The inventors have conceived that, as a result of the foregoing, the rolling property can be suppressed even in the toner having a high circularity, and the cleaning property can be made satisfactory.

When the inorganic oxide particle is a particle of an oxide containing at least one element selected from the group consisting of: Si; Mg; Al; Ti; and Sr that do not inhibit the electrophotographic characteristics of an electrophotographic apparatus, a difference in specific gravity from the organic component in the toner can be caused. A silica particle is particularly preferred from the viewpoint of improving the durability of the toner, and with the silica particle, the effects of the present disclosure are easily obtained until the latter half of endurance even when the life of the apparatus is extended. In addition, when the Sm/St is 4.0% or more, the inorganic oxide particle is incorporated in a volume sufficient for causing a difference in specific gravity of the toner. When the Sm/St is less than 4.0%, the difference in specific gravity in the toner is small, and the rolling property cannot be suppressed, with the result that the cleaning property deteriorates. The Sm/St may be controlled by the addition amount and particle diameter of the inorganic oxide particle.

Further, when the standard deviation of the Sm is less than 0.40, the bias of the difference in specific gravity becomes smaller, and hence the rolling property of the toner cannot be suppressed, with the result that the cleaning property deteriorates. The standard deviation of the Sm is preferably 0.50 or more. The standard deviation of the Sm may be controlled by the addition amount, particle diameter, and shape of the inorganic oxide particle.

In addition, the toner of the present disclosure has an average circularity of 0.950 or more. When the average circularity is less than 0.950, a reducing effect on the adhesive force of the toner becomes smaller, and the transferability thereof deteriorates. The average circularity is preferably 0.50 or more. The average circularity may be controlled by the conditions of a toner production method, for example, a hot-air surface treatment step described later in the case of a pulverization method.

In addition, in the toner of the present disclosure, it is preferred that the long diameter of the inorganic oxide particle be from 400 nm to 3,000 nm in a cross-section observed with a transmission electron microscope. When the long diameter is 400 nm or more, bias is easily caused in the difference in specific gravity between the organic component and the inorganic component in the toner, and the effects of the present disclosure are easily obtained. In particular, in the case where the toner is obtained by a pulverization production method, the inorganic oxide particle easily forms a pulverization interface when the long diameter of the inorganic oxide particle is 400 nm or more. As a result, the center of gravity of the toner is easily biased, and the effects of the present disclosure are easily obtained. When the long diameter is 3.000 nm or less, the durability is improved, and the effects of the present disclosure are easily obtained until the latter half of the endurance even in the case where the life is extended. The long diameter is more preferably 750 to 3,000 nm. The long diameter of the inorganic oxide particle may be controlled by the number of revolutions, screen size, and number of passes of a pulverizer at the time of the production of the inorganic oxide particle described later. Alternatively, the long diameter may also be controlled by classifying the inorganic oxide particle.

In addition, in the toner of the present disclosure, it is preferred that the inorganic oxide particle include a pointed portion described later in the cross-section observed with the transmission electron microscope. The pointed portion of the inorganic oxide particle refers to a site in which the angle illustrated in FIG. 1 in the observed cross-section of the toner is 90° or less. A specific method of determining whether or not the inorganic oxide particle includes the pointed portion is described later. Because of the presence of the pointed portion, the inorganic oxide particle easily forms a pulverization interface particularly when the toner is obtained by the pulverization production method. As a result, the center of gravity of the toner is easily biased, and the effects of the present disclosure are easily obtained. The presence or absence of the pointed portion of the inorganic oxide particle may be controlled by the number of revolutions and slit width of the pulverizer at the time of the production of the inorganic oxide particle.

Further, it is preferred that the inorganic oxide particle observed with the transmission electron microscope have a shape factor SF-1 of 140 or more. When the SF-1 is 140 or more, the inorganic oxide particle easily forms a pulverization interface particularly in the case where the toner is obtained by the pulverization production method. As a result, the center of gravity of the toner is easily biased, and the effects of the present disclosure are easily obtained. The shape factor SF-1 of the inorganic oxide particle may be controlled by the number of revolutions, screen size, and number of passes of the pulverizer at the time of the production of the inorganic oxide particle.

In addition, it is preferred that the toner of the present disclosure further include an external additive, and the external additive have a coating ratio of 75% or more. When the coating ratio of the external additive is 75% or more, the effects of the present disclosure are easily obtained until the latter half of the endurance even in the case where the life is extended. The coating ratio of the external additive may be controlled by the kind and addition amount of the external additive.

An embodiment of the present disclosure is described below in detail.

[Inorganic Oxide Particle]

A method of producing the inorganic oxide particle of the present disclosure has no particular restrictions, and those produced by a known method may be used. In particular, as a method of producing silica particles, there are given a gas-phase process involving reacting a silicon compound, such as a metal silicon, a silicon halide, or a silane compound, in a gas phase, and a wet process involving hydrolyzing and condensing a silane compound such as an alkoxysilane. The production method of silica particles that may be used in the toner of the present disclosure may be selected without any restrictions. The silica particles suitable for the present disclosure are relatively as large as 400 to 3,000 nm, and hence a gas-phase oxidation method involving directly oxidizing powder raw materials with chemical flame formed of oxygen and hydrogen is particularly preferably used. The gas-phase oxidation method can instantaneously set the inside of a reaction vessel to the melting point of inorganic fine powder or more, and hence is a production method preferred for obtaining large silica particles.

As for the silica particles, silica particles each having the pointed portion may be obtained, for example, by producing silica particles each having a diameter of from about 3,000 nm to about 5,000 nm by such a gas-phase oxidation method as described above, and pulverizing the resultant by a known method. For example, when an apparatus having a high pulverization ability, such as a pulverizer or a jet mill, is used as a pulverizing machine, the shapes and particle diameters of the silica particles are easily controlled. The shapes and the particle diameters may be controlled by changing the number of revolutions, slit width, and the like of the pulverizer. In addition, the particle size distribution of the particles may be appropriately adjusted through use of a known classifying apparatus.

In particular, in order to form the pointed portion in each of the silica particles, it is preferred that a pulverization step be included in the production of the silica particles. According to investigations by the inventors of the present disclosure, it is difficult to form the pointed portion by general production methods for fumed silica, sol-gel silica, and the like. In addition, the particle size distribution of the particles may be appropriately adjusted through use of a known classifying apparatus.

Similarly, a production method may be selected without any restrictions for oxides of Mg, Al, Ti, and Sr. The size and shape of such oxide are adjusted to those suitable for the present disclosure by, for example, producing the oxide through refining and synthesis by using a mineral as a raw material, and pulverizing and classifying the oxide as required.

[Toner]

The toner contains the binding resin. The binding resin is not particularly limited, and a known material, such as a vinyl-based resin or a polyester-based resin, may be used.

Specifically, polystyrene, a styrene-based copolymer, such as a styrene-propylene copolymer, a styrene-vinyltoluene copolymer, a styrene-methyl acrylate copolymer, a styrene-ethyl acrylate copolymer, a styrene-butyl acrylate copolymer, a styrene-octyl acrylate copolymer, a styrene-methyl methacrylate copolymer, a styrene-ethyl methacrylate copolymer, a styrene-butyl methacrylate copolymer, a styrene-octyl methacrylate copolymer, a styrene-butadiene copolymer, a styrene-isoprene copolymer, a styrene-maleic acid copolymer, or a styrene-maleic acid ester copolymer, a polyacrylic acid ester, a polymethacrylic acid ester, polyvinyl acetate, or the like may be used. Those binding resins may be used alone or in combination thereof. The binding resin is preferably an amorphous resin. As the binding resin, a styrene-based copolymer and a polyester resin are each preferred from the viewpoints of developing characteristics, fixability, and the like. The polyester resin is preferably an amorphous polyester resin. The binding resin more preferably contains a styrene-acrylic resin. With the styrene-acrylic resin, the durability of the toner is improved, and the effects of the present disclosure are easily obtained until the latter half of the endurance even in the case where the life of an electrophotographic apparatus is extended.

Further, it is preferred that two or more of peaks or shoulders be present in the range of a weight-average molecular weight Mw of 3,000 to 2,000,000 in a molecular weight distribution of a tetrahydrofuran soluble component of the binding resin. When two or more of peaks or shoulders are present in the weight-average molecular weight range of 3,000 to 2,000,000, the durability is improved, and the effects of the present disclosure are easily obtained until the latter half of the endurance even in the case where the life is extended.

In the present disclosure, it is preferred that a release agent be incorporated as one of the materials for forming a toner base. In particular, when an ester wax having a melting point of 60° C. or more and 90° C. or less is used, a plasticizing effect is easily obtained because of the excellent compatibility of the ester wax with the binding resin.

Examples of the ester wax to be used in the present disclosure include: waxes each including a fatty acid ester as a main component, such as a carnauba wax and a montanic acid ester wax; a wax obtained by removing part or the whole of an acid component from a fatty acid ester such as a deacidified carnauba wax; a methyl ester compound having a hydroxyl group obtained by, for example, hydrogenating a plant oil and fat; saturated fatty acid monoesters, such as stearyl stearate and behenyl behenate; diesterified products of a saturated aliphatic dicarboxylic acid and a saturated aliphatic alcohol, such as dibehenyl sebacate, distearyl dodecanedioate, and distearyl octadecanedioate; and diesterified products of a saturated aliphatic diol and a saturated aliphatic monocarboxylic acid, such as nonanediol dibehenate and dodecanediol distearate.

Of those waxes, a difunctional ester wax (diester) having two ester bonds in a molecular structure thereof is preferably included.

The difunctional ester wax is an ester compound of a dihydric alcohol and an aliphatic monocarboxylic acid, or an ester compound of a divalent carboxylic acid and an aliphatic monoalcohol.

Specific examples of the aliphatic monocarboxylic acid include myristic acid, palmitic acid, stearic acid, arachidic acid, behenic acid, lignoceric acid, cerotic acid, montanic acid, melissic acid, oleic acid, vaccenic acid, linoleic acid, and linolenic acid.

Specific examples of the aliphatic monoalcohol include myristyl alcohol, cetanol, stearyl alcohol, arachidyl alcohol, behenyl alcohol, tetracosanol, hexacosanol, octacosanol, and triacontanol.

Specific examples of the divalent carboxylic acid include butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), dodecanedioic acid, tridecanedioic acid, tetradecanedioic acid, hexadecanedioic acid, octadecanedioic acid, eicosanedioic acid, phthalic acid, isophthalic acid, and terephthalic acid.

Specific examples of the dihydric alcohol include ethylene glycol, propylene glycol, 1,3-propanediol, 1,4-butanediol, 1,5-pentanediol, 1,6-hexanediol, 1,10-decanediol, 1,12-dodecanediol, 1,14-tetradecanediol, 1,16-hexadecanediol, 1,18-octadecanediol, 1,20-eicosanediol, 1,30-triacontanediol, diethylene glycol, dipropylene glycol, 2,2,4-trimethyl-1,3-pentanediol, neopentyl glycol, 1,4-cyclohexane dimethanol, spiroglycol, 1,4-phenylene glycol, bisphenol A, and hydrogenated bisphenol A.

Examples of the other release agent that may be used include: a petroleum-based wax, such as a paraffin wax, a microcrystalline wax, or petrolatum, and derivatives thereof; a montan wax and derivatives thereof; a hydrocarbon wax obtained by a Fischer-Tropsch method and derivatives thereof; a polyolefin wax, such as polyethylene or polypropylene, and derivatives thereof; a natural wax, such as a carnauba wax or a candelilla wax, and derivatives thereof; a higher aliphatic alcohol; and a fatty acid, such as stearic acid or palmitic acid, or compounds thereof. The content of the release agent is preferably from 5.0 parts by mass to 20.0 parts by mass with respect to 100.0 parts by mass of the binding resin or a polymerizable monomer.

In the present disclosure, when a colorant is incorporated into the toner particle, the colorant is not particularly limited, and known colorants described below may be used.

As yellow pigments, there are used yellow iron oxide, naples yellow, condensed azo compounds, such as Naphthol Yellow S, Hansa Yellow G, Hansa Yellow 10G, Benzidine Yellow G, Benzidine Yellow GR, quinoline yellow lake, Permanent yellow NCG, and tartrazine lake, isoindolinone compounds, anthraquinone compounds, azo metal complexes, methine compounds, and allyl amide compounds. Specific examples thereof include the following pigments:

C.I. Pigment Yellow 12, 13, 14, 15, 17, 62, 74, 83, 93, 94, 95, 109, 110, 111, 128, 129, 147, 155, 168, and 180.

As red pigments, there are given colcothar, condensed azo compounds, such as Permanent Red 4R, lithol red, pyrazolone red, watching red calcium salt, lake red C, lake red D, Brilliant Carmine 6B, Brilliant Carmine 3B, eosin lake, rhodamine lake B, and alizarin lake, diketopyrrolopyrrole compounds, anthraquinone, quinacridone compounds, basic dye lake compounds, naphthol compounds, benzimidazolone compounds, thioindigo compounds, and perylene compounds. Specific examples thereof include the following pigments:

C.I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254.

As blue pigments, there are given alkali blue lake, Victoria blue lake, phthalocyanine blue, metal-free phthalocyanine blue, partially chlorinated phthalocyanine blue, fast sky blue, copper phthalocyanine compounds such as indanthrene blue BG, and derivatives thereof, anthraquinone compounds, and basic dye lake compounds. Specific examples thereof include the following pigments:

C.I. Pigment Blue 1, 7, 15, 15:1, 15:2, 15:3, 15:4, 60, 62, and 66.

As black pigments, there are given carbon black and aniline black. Those colorants may be used alone or as a mixture thereof, and in the state of a solid solution.

The content of the colorant is preferably from 3.0 parts by mass to 15.0 parts by mass with respect to 100.0 parts by mass of the binding resin or the polymerizable monomer.

In the present disclosure, the toner base may contain a charge control agent. A known charge control agent may be used as the charge control agent. In particular, a charge control agent having a high charging speed and being capable of stably maintaining a constant charge quantity is preferred.

Examples of the charge control agent that controls a toner particle so that the particle may be negatively chargeable include the following agents:

as organometallic compounds and chelate compounds, a monoazo metal compound, an acetylacetone metal compound, and aromatic oxycarboxylic acid-, aromatic dicarboxylic acid-, oxycarboxylic acid-, and dicarboxylic acid-based metal compounds. Other examples thereof include aromatic oxycarboxylic acids, and aromatic mono- and polycarboxylic acids, and metallic salts, anhydrides, or esters thereof, and phenol derivatives such as bisphenol. Further, there are given a urea derivative, a salicylic acid-based compound containing a metal, a naphthoic acid-based compound containing a metal, a boron compound, a quaternary ammonium salt, and a calixarene.

Meanwhile, examples of the charge control agent that controls a toner particle so that the particle may be positively chargeable include the following agents: nigrosine and modified nigrosine compounds with a fatty acid metal salt; a guanidine compound; an imidazole compound; quaternary ammonium salts, such as a tributylbenzylammonium-1-hydroxy-4-naphtosulfonate and tetrabutylammonium tetrafluoroborate, and onium salts that are analogs of the above-mentioned compounds such as a phosphonium salt, and lake pigments thereof; a triphenylmethane dye and a lake pigment thereof (examples of a laking agent include phosphotungstic acid, phosphomolybdic acid, phosphotungstic molybdic acid, tannic acid, lauric acid, gallic acid, a ferricyanide, and a ferrocyanide); a metal salt of a higher fatty acid; and a resin-based charge control agent.

Those charge control agents may be incorporated alone or in combination thereof. The addition amount of the charge control agent is preferably from 0.01 part by mass to 10.00 parts by mass with respect to 100.00 parts by mass of the binding resin or the polymerizable monomer.

The toner may contain the toner particles and an external additive on the surface of each of the toner particles. Examples of the external additive include known external additives.

Examples of the external additive may include metal oxide fine particles (inorganic fine particles), such as silica fine particles, alumina fine particles, titania fine particles, zinc oxide fine particles, strontium titanate fine particles, cerium oxide fine particles, and calcium carbonate fine particles.

In the toner, still another external additive, such as: lubricant powder, such as fluorine resin powder, zinc stearate powder, or polyvinylidene fluoride powder; an abrasive, such as cerium oxide powder, silicon carbide powder, or strontium titanate powder; a fluidity imparting agent, such as titanium oxide powder or aluminum oxide powder; a caking inhibitor; or organic fine particles and inorganic fine particles having opposite polarities may be used in a small amount as a developability improver to the extent that the external additive does not have a substantial adverse effect on the toner. Those additives may be used after their surfaces are subjected to hydrophobic treatment.

The toner has a weight-average particle diameter (D4) of preferably from 3.0 μm to 12.0 μm, more preferably from 4.0 μm to 10.0 μm. When the weight-average particle diameter (D4) falls within the above-mentioned ranges, satisfactory fluidity is obtained, and a latent image can be faithfully developed.

[Toner Production Method]

A conventionally known method may be used as a toner production method of the present disclosure without any particular limitations. Specific examples thereof include a suspension polymerization method, a dissolution suspension method, an emulsion aggregation method, a spray drying method, and a pulverization method. Of those, a pulverization method including a step of melting and kneading a binding resin and inorganic oxide particles, and a step of subjecting toner particles to surface treatment with hot air is preferred. According to the pulverization method, the inorganic oxide particles easily form a pulverization interface in the pulverization step, and bias is easily caused in the presence of the inorganic oxide particles in the toner particles, with the result that the effects of the present disclosure are easily obtained.

The pulverization method involving producing a toner through the melting and kneading step, and the pulverization step is specifically described below, but the present disclosure is not limited thereto.

For example, a binding resin, inorganic oxide particles, and as required, a colorant, a release agent, a charge control agent, and other additives are sufficiently mixed with a mixer, such as a Henschel mixer or a ball mill (mixing step). The resultant mixture is melted and kneaded with a thermal kneader, such as a twin-screw kneading extruder, a heating roll, a kneader, or an extruder (melting and kneading step).

After the resultant melted and kneaded product is cooled and solidified, the resultant is pulverized with a pulverizing machine (pulverization step). Then, the resultant is classified with a classifier (classification step) to provide toner particles. The toner particles may be directly used as a toner. As required, the toner particles and the external additives may be mixed with a mixer such as a Henschel mixer to provide a toner.

Examples of the mixer include the following mixers: FM mixer (manufactured by Nippon Coke & Engineering Co., Ltd.): Super Mixer (manufactured by Kawata Mfg. Co., Ltd.): Ribocone (manufactured by Okawara Mfg. Co., Ltd.); Nauta Mixer, Turburizer, and Cyclomix (manufactured by Hosokawa Micron Corporation); Spiral Pin Mixer (manufactured by Pacific Machinery & Engineering Co., Ltd.): and Loedige Mixer (manufactured by Matsubo Corporation).

Examples of the thermal kneader include the following thermal kneaders: KRC Kneader (manufactured by Kurimoto, Ltd.); Buss Ko-Kneader (manufactured by Buss); TEM-type extruder (manufactured by Toshiba Machine Co., Ltd.); TEX twin screw kneader (manufactured by The Japan Steel Works, Ltd.): PCM kneader (manufactured by Ikegai Ironworks Corp); THREE ROLL MILL, MIXING ROLL MILL, and Kneader (manufactured by Inoue Mfg., Inc.); KNEADEX (manufactured by Mitsui Mining Co., Ltd.): MS TYPE PRESSURIZATION KNEADER and KNEADER-RUDER (manufactured by Moriyama Company Ltd.): and Banbury mixer (manufactured by Kobe Steel, Ltd.).

Examples of the pulverizer include the following pulverizers: Counter Jet Mill, Micron Jet, and Inomizer (manufactured by Hosokawa Micron Corporation); IDS-type Mill and PJM Jet Pulverizer (manufactured by Nippon Pneumatic Mfg. Co., Ltd.); Cross Jet Mill (manufactured by Kurimoto, Ltd.): NSE-ULMAX (manufactured by Nisso Engineering Co., Ltd.); SK Jet-O-Mill (manufactured by Seishin Enterprise Co., Ltd.); Kryptron (manufactured by Kawasaki Heavy Industries, Ltd.); Turbo Mill (manufactured by Turbo Kogyo Co., Ltd.): and Super Rotor (manufactured by Nisshin Engineering Inc.).

Examples of the classifier include the following classifiers: Classiel, Micron Classifier. and Spedic Classifier (manufactured by Seishin Enterprise Co., Ltd.); Turbo Classifier (manufactured by Nisshin Engineering Inc.); Micron Separator, Turboprex (ATP), and TSP Separator (manufactured by Hosokawa Micron Corporation); Elbow-Jet (manufactured by Nittetsu Mining Co., Ltd.); Dispersion Separator (manufactured by Nippon Pneumatic Mfg. Co., Ltd.); and YM Microcut (manufactured by Yasukawa Shoji K.K.).

In addition, the following sifter may be used for sieving coarse particles: Ultra Sonic (manufactured by Koei Sangyo Co., Ltd.); Rezona Sieve and Gyro Sifter (manufactured by Tokuju Corporation); Vibrasonic System (manufactured by Dalton Co., Ltd.); Sonicreen (manufactured by Shinto Kogyo K.K.); Turbo Screener (manufactured by Turbo Kogyo Co., Ltd.); Microsifter (manufactured by Makino Mfg. Co., Ltd.); or a circular vibrating sieve.

The surface of each of the toner base particles thus obtained may be subjected to an adhesion step of causing inorganic particles to adhere to the surface and a hot-air surface treatment step. There are no particular limitations on a method of causing the inorganic particles to adhere to the surface of each of the toner base particles in the adhesion step, and the toner base particles and the inorganic particles are weighed in predetermined amounts, and blended and mixed. As an example of a mixing apparatus, there is given a double cone mixer, a V-type mixer, a drum-type mixer, a super mixer, a Henschel mixer, or a Nauta mixer, and each of the mixers is preferably used.

As for mixing conditions, the higher rotation speed of a mixing blade and a longer mixing time are preferred because boron nitride particles are easily caused to uniformly adhere to the surface of each of the toner base particles. However, when the number of revolutions of the mixing blade is too high or the mixing time is too long, friction heat between the toner and the mixing blade becomes higher, and the toner may be increased in temperature to be fused. Accordingly, it is preferred that the mixer be actively cooled, for example, by providing a water-cooling jacket to the mixing blade or the mixer.

It is preferred that the number of revolutions of the mixing blade and the mixing time be adjusted to a range in which a temperature in the mixer reaches 45° C. or less. Specifically, the maximum peripheral speed of the mixing blade is preferably from 10.0 m/s to 150.0 m/s, and the mixing time is preferably adjusted to a range of from 0.5 minute to 60 minutes.

In addition, the adhesion step may be performed in one stage or in a plurality of stages such as two or more stages, and the mixing apparatus, the mixing conditions, the blending of the toner base particles, and the like used in each of the stages may be the same as or different from those in any other stage.

Next, an apparatus including a unit that brings the surface of each of the toner base particles before treatment into a molten state with hot air and a unit capable of cooling, with cold air, the toner particles treated with the hot air may be used as an apparatus used for the surface treatment of the toner base particles.

As such apparatus, there may be given, for example, Meteorainbow MR Type (manufactured by Nippon Pneumatic Mfg. Co., Ltd.).

Figure 2:
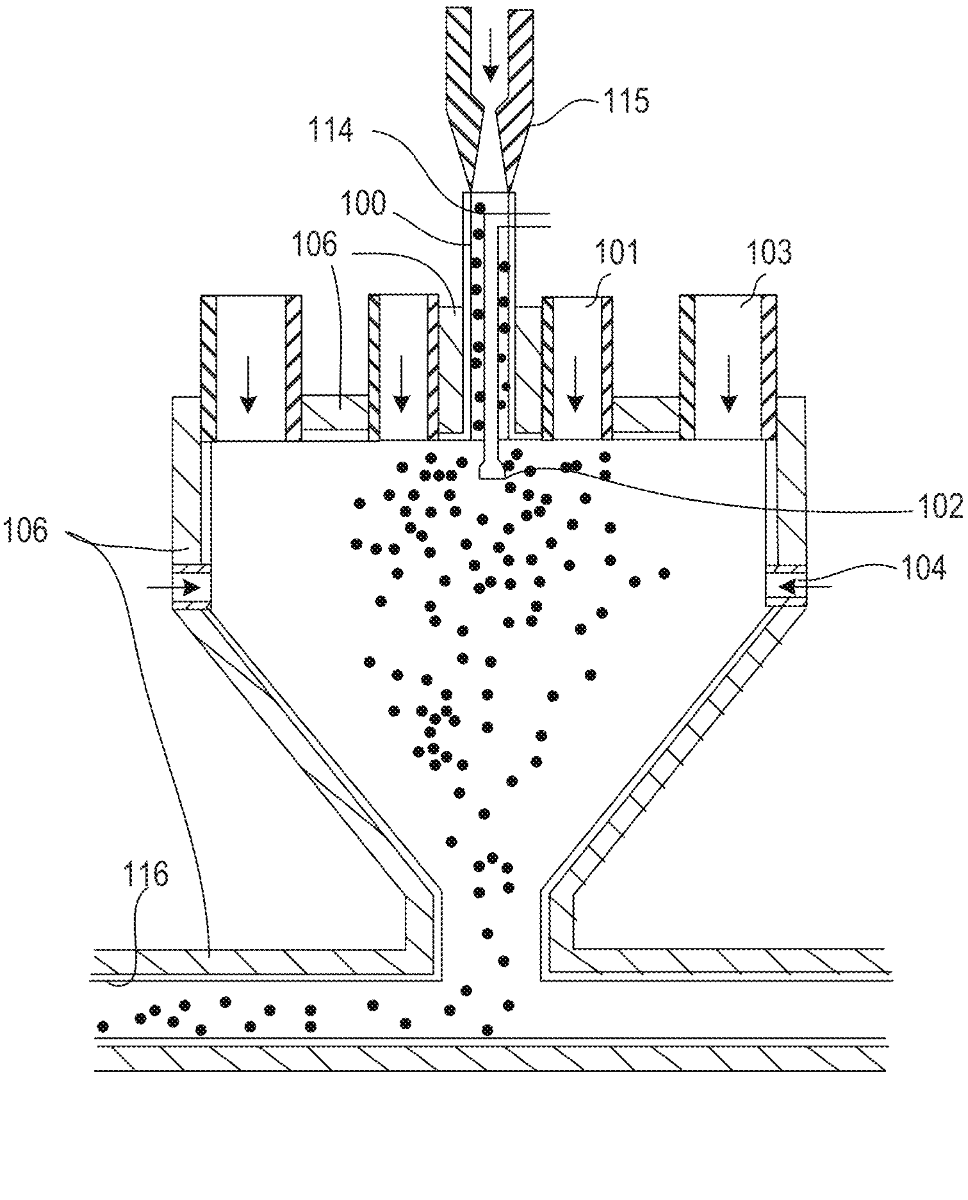
FIG. 2 is a sectional view of a surface treatment apparatus using hot air.

One aspect of a surface treatment method using hot air is described with reference to FIG. 2, but the present disclosure is not limited thereto. FIG. 2 is an example of a sectional view of a surface treatment apparatus used in the present disclosure. Specifically, as a surface treatment method, a raw material is prepared by causing organosilicon polymer particles to adhere to the surface of each of the toner base particles in advance, and the raw material is supplied to the surface treatment apparatus.

Then, toner particles 114 before the surface treatment supplied from a toner particle supply port 100 are accelerated with injection air jetted from a high-pressure air supply nozzle 115 and directed to an airflow jetting member 102 on a lower side.

Diffusion air is jetted from the airflow jetting member 102, and the toner particles 114 are diffused to an outside direction with the diffusion air. In this case, the diffusion state of the toner particles can be controlled by adjusting the flow rate of the injection air and the flow rate of the diffusion air.

In addition, in order to prevent the fusion of the toner particles, a cooling jacket 106 is provided on each of an outer periphery of the toner particle supply port 100, an outer periphery of the surface treatment apparatus, and an outer periphery of a transfer pipe 116.

It is preferred that cooling water (preferably an antifreeze such as ethylene glycol) be caused to pass through the cooling jacket.

Meanwhile, the surface of each of the toner particles diffused with the diffusion air is treated with hot air supplied from the hot air supply port 101.

In this case, the discharge temperature of the hot air is equal to or more than the softening point of the toner, preferably 120° C. or more and 300° C. or less, more preferably 150° C. or more and 250° C. or less.

When the temperature of the hot air is equal to or more than the softening point of the toner, the binding resin is melted, with the result that the organosilicon polymer particles are stuck to the toner base particles.

When the discharge temperature of the hot air is more than 300° C., the molten state of the toner particles excessively advances, and the coalescence of the toner particles is liable to occur in a production process. As a result, coarsening of the toner particles and severe fusion of the toner particles to an inner wall surface of the apparatus may occur.

The toner particles having the surfaces treated with the hot air are cooled with cold air supplied from a cold air supply port 103 formed on an outer periphery of an upper portion of the apparatus. In this case, it is preferred that the cold air be introduced from a second cold air supply port 104 formed on a side surface of a main body of the apparatus in order to control a temperature distribution in the apparatus and the surface state of each of the toner particles. A slit shape, a louver shape, a perforated plate shape, a mesh shape, or the like may be used for an outlet of the second cold air supply port 104, and a direction horizontal to the center direction or a direction along the wall surface of the apparatus may be selected as the direction of introduction depending on purposes.

In this case, it is preferred that the air flow of the hot air and the air flow of the cold air be adjusted to be small so that long crosslinking reaction time can be secured.

In addition, it is preferred that the cold air be dehumidified air because water molecules generated during the crosslinking reaction can be discharged out of the system. Specifically, the absolute moisture content in the cold air is preferably 5 g/m$^3$ or less, more preferably 3 g/m$^3$ or less.

After that, the cooled toner particles are sucked by a blower and collected by a cyclone or the like through the transfer pipe 116.

[Measurement Method for Each Physical Property]

Next, a measurement method for each physical property is described.

<Composition Analysis of Inorganic Oxide Particle>

The inorganic oxide particles incorporated into the toner particles of the present disclosure refer to the inorganic oxide particles incorporated into the toner base particles at the time before: the adhesion step in which the inorganic oxide particles are caused to adhere to the surface of each of the toner base particles before the hot-air surface treatment step: and an external addition step. Based on sectional images of the toner particles observed with a transmission electron microscope (TEM), particles each having an area of 80% or more present on an inner side by 100 nm or more from the outer periphery of the toner were adopted as the inorganic oxide particles incorporated into the toner particles. In addition, it was recognized that the particles were those formed of at least one element selected from Si, Mg, Al, Ti, and Sr, and oxygen with an energy dispersive X-ray spectrometer (EDX), and the composition of each of the inorganic oxide particles was identified.

Images of cross-sections of toner particles with the transmission electron microscope (TEM) are produced as described below.

An Os film (5 nm) and a naphthalene film (20 nm) are formed as protective films on a toner with an osmium plasma coater (Filgen, Inc., OPC80T), and the resultant toner is embedded with a photocurable resin D800 (JEOL Ltd.). Then, cross-sections of toner particles each having a thickness of 60 nm (or 70 nm) are produced with an ultrasonic ultramicrotome (Leica. UC7) at a cutting speed of 1 mm/s.

Each of the resultant cross-sections is subjected to STEM observation through use of the STEM function of a TEM (JEOL Ltd., JEM-2800). The cross-sections are each acquired at a STEM probe size of 1 nm and an image size of 1,024 pixels×1,024 pixels. Of the cross-sections of the toner particles, cross-sections each having a diameter of from 0.9 times to 1.1 times as large as the weight-average particle diameter of the toner are selected.

<Measurement of Long Diameter, Area Sm, and Shape Factor SF-1 of Inorganic Oxide Particle, and Area St of Toner>

With use of the resultant images, the long diameter of each of the inorganic oxide particles is determined with image processing software "Image-Pro Plus ver. 4.0 (manufactured by Media Cybernetics, Inc.)." In the calculation of the long diameter, the cross-sections of 100 toner particles are observed, and the number average of their long diameters is adopted as the long diameter of the inorganic oxide particle. Similarly, the cross-sections of the 100 toner particles are observed, and the sectional areas of the toner particles and the areas of the inorganic oxide particles are determined, and the averages thereof are adopted as the sectional area St of the toner and the area Sm of the inorganic oxide particle, respectively.

In addition, the shape factor SF-1 of the inorganic oxide particle is determined by the following equation based on the long diameter of the inorganic oxide particle and the area Sm of the inorganic oxide particle calculated above.

$$\text{SF-1}=(\text{long diameter of inorganic oxide particle})^2/\text{area Sm of inorganic oxide particle}\times\pi/4\times100$$

SF-1s were calculated from the cross-section observation of the 100 toner particles, and an average thereof was adopted as the shape factor SF-1 of the inorganic oxide particle.

<Method of Determining Standard Deviation of Area Sm of Inorganic Oxide Particle>

In the sectional images of the toner particles observed with the transmission electron microscope (TEM) described above, the standard deviation of the area Sm of the inorganic oxide particle that occupied each of four regions obtained by dividing the cross-section of the toner by a long diameter of the toner and a perpendicular bisector of the long diameter was determined.

<Measurement of Average Circularity of Toner>

The circularity of the toner is measured with a flow-type particle image analyzer "FPIA-3000" (manufactured by Sysmex Corporation) under measurement and analysis conditions at the time of calibration work.

The measurement principle of the flow-type particle image analyzer "FPIA-3000" (manufactured by Sysmex Corporation) is to take photographs of flowing particles as still images and perform image analysis. A sample added to a sample chamber is fed to a flat sheath flow cell by a sample suction syringe. The sample fed to the flat sheath flow cell is sandwiched by a sheath fluid to form a flat flow.

The sample passing through the flat sheath flow cell is irradiated with strobe light at 1/60 second intervals, and hence the photographs of the flowing particles can be taken as still images. In addition, the flowing particles form a flat flow, and hence their photographs are taken in a focused state. Particle images are taken with a CCD camera, and the images that have been taken are subjected to image processing at an image processing resolution of 512 pixels×512 pixels (0.37 μm×0.37 μm per pixel). Then, the contour of each of the particle images is extracted, and the projected area S, perimeter L, and the like of each of the particle images are measured.

Next, a circle-equivalent diameter and a circularity C are determined through use of the area S and the perimeter L. The circle-equivalent diameter refers to a diameter of a circle having the same area as the projected area of the particle image, and the circularity C is defined as a value obtained by dividing the perimeter of the circle determined from the circle-equivalent diameter by the perimeter of the particle projected image, and is calculated by the following equation.

$$\text{Circularity } C=2\times(\pi\times S)^{1/2}/L$$

The circularity becomes 1.000 when the particle image is circular, and when the degree of unevenness of the outer periphery of the particle image is increased, the circularity becomes a smaller value. After the circularity of each particle is calculated, the circularity range of from 0.200 to 1.000 is divided into 800 parts. Then, the arithmetic mean value of the obtained circularities is calculated, and the value thereof is adopted as an average circularity.

A specific measurement method is as described below. First, 20 mL of ion-exchanged water having solid impurities and the like removed therefrom in advance is loaded into a container made of glass. 0.2 mL of a diluted solution prepared by diluting "Contaminon N" (10 mass % aqueous solution of a neutral detergent for washing a precision measuring device formed of a nonionic surfactant, an anionic surfactant, and an organic builder, and having a pH of 7, manufactured by Wako Pure Chemical Industries, Ltd.) with ion-exchanged water by three mass fold is added as a dispersant to the ion-exchanged water.

Further, 0.02 g of a measurement sample is added to the resultant, and dispersion treatment is performed for 2 minutes with an ultrasonic disperser to provide a dispersion liquid for measurement. In this case, the dispersion liquid is appropriately cooled so that the temperature thereof may reach 10° C. or more and 40° C. or less. A tabletop ultrasonic cleaner disperser having an oscillation frequency of 50 kHz and an electrical output of 150 W (for example, "VS-150" (manufactured by Velvo-Clear Co.)) is used as the ultrasonic disperser. A predetermined amount of ion-exchanged water is loaded into a water tank, and 2 mL of the Contaminon N is added to the water tank.

For the measurement, the flow-type particle image analyzer equipped with a standard objective lens (magnification: 10 times) is used, and a particle sheath "PSE-900A" (manufactured by Sysmex Corporation) is used as a sheath liquid. The dispersion liquid prepared according to the above-mentioned procedure is introduced into the flow-type particle image analyzer, and the particle diameters of 3,000 toner particles are measured in an HPF measurement mode and a total count mode. Then, a binarization threshold at the time of particle analysis is set to 85%, and a particle diameter to be analyzed is limited to a circle-equivalent diameter of 1.985 μm or more and less than 39.69 μm, followed by the determination of the average circularity of the toner particles.

As for the measurement, automatic focusing adjustment is performed through use of standard latex particles before the start of the measurement. For example, "RESEARCH AND TEST PARTICLES Latex Microsphere Suspensions 5200A" manufactured by Duke Scientific Corporation is diluted with ion-exchanged water and used. After that, it is preferred that focus adjustment be performed every two hours from the start of the measurement.

In Examples of the present application, a flow-type particle image analyzer that has been calibrated by Sysmex Corporation and has received an issue of a calibration certificate issued by Sysmex Corporation is used. The measurement is performed under measurement and analysis conditions at the time of the reception of the calibration certificate except that a particle diameter to be analyzed is limited to a circle-equivalent diameter of 1.985 μm or more and less than 39.69 μm.

<Observation of Pointed Portion of Inorganic Oxide Particle>

In the image in which the inorganic oxide particle is observed, the angle of an end portion is calculated with image processing software "Image-Pro Plus ver. 4.0 (manufactured by Media Cybernetics. Inc.)." Specifically, as illustrated in FIG. 1, the end portion of the inorganic oxide particle is detected with the Edge Detector of the above-mentioned software.

A circle (circle 2 in FIG. 1) having a radius of 200 nm in which the detected end portion is positioned at the center is drawn. Two straight lines connecting intersections of the circle and the contour of the inorganic oxide particle (1 in FIG. 1) and the end portion are drawn, and lines each having a width of 50 nm (two lines extending from the center of the circle 2 to the contour of the circle 2 in FIG. 1) are drawn with the straight lines being the center. A view for illustrating the contour line of the inorganic oxide particle included in the two lines each having a width of 50 nm is "an enlarged view of line portions" in the figure. Here, when the contour line of the inorganic oxide particle is not included in the width of 50 nm, the end portion is not analyzed. The angle (3 in FIG. 1) formed by the two lines each having a width of 50 nm is analyzed with the above-mentioned software. When the angle is 900 or less, it is determined that the inorganic oxide particle has a pointed portion.

When cross-sections of 100 toner particles were observed, and 90% or more of the inorganic oxide particles each having a pointed portion were present, it was determined that the inorganic oxide particles incorporated into the toner particles each had a pointed portion.

<Composition Analysis of Binding Resin>

Separation Method for Binding Resin 100 mg of a toner is dissolved in 3 ml of chloroform. Then, an insoluble content is removed by suction and filtration with a syringe fitted with a sample treatment filter (pore size of 0.2 μm or more and 0.5 μm or less, for example, Myshoridisk H-25-2 (manufactured by Tosoh Corporation) is used). A soluble content is introduced into a preparative HPLC (apparatus: LC-9130 NEXT preparative column [60 cm], manufactured by Japan Analytical Industry Co., Ltd., exclusion limits: 20,000 and 70,000, two columns connected), and a chloroform eluent is fed. When a peak is recognized by the display of the obtained chromatograph, the retention time of a monodisperse polystyrene standard sample having a molecular weight of 2,000 or more is sorted. The resultant solution of fractions is dried and solidified to provide a binding resin.

Identification of Component, and Measurement of Mass Ratio, of Binding Resin by Nuclear Magnetic Resonance Spectroscopy (NMR)

1 mL of deuterated chloroform is added to 20 mg of a toner, and an NMR spectrum of protons in the dissolved binding resin is measured. The content of monomer units for forming a binding resin such as a styrene-acrylic resin can be determined by calculating the molar ratio and mass ratio of each monomer from the obtained NMR spectrum. For example, in the case of a styrene-acrylic copolymer, its composition ratio and mass ratio can be calculated based on a peak in the vicinity of 6.5 ppm derived from a styrene monomer and a peak in the vicinity of from 3.5 ppm to 4.0 ppm derived from an acrylic monomer. In addition, in the case of a copolymer of a polyester resin and a styrene-acrylic resin, the content of monomer units of the polyester resin is determined by calculating the molar ratio and mass ratio of the copolymer also together with a peak derived from each monomer for forming the polyester resin and a peak derived from the styrene-acrylic copolymer.

NMR apparatus. JEOL RESONANCE ECX 500
Observation nucleus: Proton
Measurement mode: single pulse
Reference peak: TMS <Measurement of Weight-Average Molecular Weight Mw>

The molecular weight distribution (weight-average molecular weight Mw, number-average molecular weight Mn, and peak molecular weight) of the toner is measured by gel permeation chromatography (GPC) as described below.

First, a sample is dissolved in tetrahydrofuran (THF) over 24 hours at room temperature. The resultant solution is then filtered through a solvent-resistant membrane filter "Myshoridisk" (manufactured by Tosoh Corporation) having a pore diameter of 0.2 μm to provide a sample solution. The sample solution is adjusted so that the concentration of THF-soluble components may become 0.8 mass %. The measurement is performed under the following conditions through use of the sample solution.

Apparatus: HLC8120GPC (detector: RI) (manufactured by Tosoh Corporation)
Column: Shodex KF-801, 802, 803, 804, 805, 806, and 807 in 7 columns (manufactured by Showa Denko K.K.)
Eluent: tetrahydrofuran (THF)
Flow velocity: 1.0 ml/min
Oven temperature: 40.0° C.
Sample injection amount: 0.10 ml In calculation of the molecular weight of the sample, a molecular weight calibration curve prepared through use of a standard polystyrene resin (for example, a product available under the product name "TSK Standard Polystyrene F-850, F-450, F-288, F-128, F-80, F-40, F-20, F-10, F-4, F-2, F-1, A-5000, A-2500, A-1000, or A-500" from Tosoh Corporation) is used.

<Measurement of Coating Ratio of External Additive>

Photographs of the surfaces of toner particles are taken with FE-SEM S-4800 (manufactured by Hitachi, Ltd.) at a magnification of 50,000 times. From the observed images, the coating ratio of an external additive was calculated as described below with image processing software "ImageJ". Through particle analysis, particles derived from the external additive in the images are selected on the software. Next, the area of a selection screen is displayed by setting of the measurement. This value was divided by the area of the total field of view to provide the coating ratio of the external additive in the field of view.

The conditions for taking an image with the S-4800 are as described below.

(1) Sample Preparation

A conductive paste is thinly applied to a sample stage (aluminum sample stage: 15 mm×6 mm), and a toner is sprayed onto the conductive paste. Further, air blowing is performed to remove an excess toner from the sample stage, to thereby sufficiently dry the sample stage. The sample stage is set on a sample holder, and the height of the sample stage is adjusted to 36 mm with a sample height gauge.

(2) S-4800 Observation Condition Setting

Liquid nitrogen is injected into an anti-contamination trap mounted to a housing of the S-4800 until the liquid nitrogen overflows, and the resultant is allowed to stand for 30 minutes. "PC-SEM" of the S-4800 is activated to perform flushing (cleaning of an FE chip that is an electron source). An acceleration voltage display part of a control panel on the screen is clicked, and a [Flushing] button is pressed, to thereby open a flushing execution dialog. The flushing intensity is recognized to be 2, and the flushing is performed. An emission current by the flushing is recognized to be from 20 μA to 40 μA. The sample holder is inserted into a sample chamber of the housing of the S-4800. An [Origin] button on the control panel is pressed to move the sample holder to an observation position.

The acceleration voltage display part is clicked to open an HV setting dialog. The acceleration voltage is set to [1.1 kV], and the emission current is set to [20 μA]. In a [Basic] tab of an operation panel, signal selection is set to [SE]. [Upper (U)] and [+BSE] for a SE detector are selected, and [L.A.100] is selected in a selection box on the right of the [+BSE] to set a mode for observation in a backscattered electron image. Similarly, in the [Basic] tab of the operation panel, a probe current in an electron optical system condition block is set to [Normal], a focus mode is set to [UHR], and a WD is set to [4.5 mm]. An [ON] button in the acceleration voltage display part of the control panel is pressed to apply an acceleration voltage.

(3) Calculation of Number-Average Particle Diameter (D1) of Toner

Dragging is performed within a magnification display part of the control panel to set the magnification to 5,000 (5 k) times. A focus knob [COARSE] of the operation panel is turned, and aperture alignment is adjusted when the focusing is achieved to some extent. [Align] of the control panel is clicked to display an alignment dialog, and [Beam] is selected. STIGMA/ALIGNMENT knobs (X, Y) of the operation panel are turned to move a displayed beam to the center of a concentric circle. Next, [Aperture] is selected, and the STIGMA/ALIGNMENT knobs (X, Y) are turned one by one, to thereby make adjustment so that the movement of an image may be stopped or minimized. An aperture dialog is closed, and the image is brought into focus with an autofocus. This operation is further repeated twice to bring the image into focus.

(4) Focus Adjustment

Regarding the toner particles each having a particle diameter of the number-average particle diameter (D1)±0.1 μm obtained in the section (3), dragging is performed within the magnification display part of the control panel under a state in which the middle point of the maximum diameter is aligned with the center of a measurement screen, to thereby set the magnification to 10,000 (10 k) times.

The focus knob [COARSE] of the operation panel is turned, and the aperture alignment is adjusted when the focusing is achieved to some extent. The [Align] of the control panel is clicked to display the alignment dialog, and the [Beam] is selected. The STIGMA/ALIGNMENT knobs (X, Y) of the operation panel are turned to move a displayed beam to the center of a concentric circle.

Next, the [Aperture] is selected, and the STIGMA/ALIGNMENT knobs (X, Y) are turned one by one, to thereby make adjustment so that the movement of an image may be stopped or minimized. The aperture dialog is closed, and the image is brought into focus with the autofocus. After that, the magnification is set to 50,000 (50 k) times, focus adjustment is performed through use of the focus knob and the STIGMA/ALIGNMENT knobs in the same manner as above, and the image is brought into focus with the autofocus again. This operation is repeated again to bring the image into focus. Here, when the inclination angle of an observation surface is large, the measurement accuracy of the coating ratio becomes liable to be lowered. Accordingly, at the time of focus adjustment, adjustment is selected so that the entire observation surface may be simultaneously brought into focus, followed by the selection and analysis of the observation surface having the minimum inclination.

(5) Image Saving

Brightness is adjusted in an ABC mode, and a photograph is taken and saved with a size of 640 pixels×480 pixels. The following analysis is performed through use of this image file. One photograph is taken for one toner particle, and images are obtained for 25 toner particles.

<Measurement of Particle Diameter of Toner>

A precision particle size distribution measuring apparatus based on a pore electrical resistance method (product name: Coulter Counter Multisizer) and dedicated software (product name: Beckman Coulter Multisizer 3 Version 3.51, manufactured by Beckman Coulter, Inc.) are used. An aperture diameter of 100 μm is used, and measurement is performed with the number of effective measurement channels of 25,000, followed by the analysis of measurement data to calculate particle diameters. An electrolyte aqueous solution prepared by dissolving special grade sodium chloride in ion-exchanged water so as to have a concentration of about 1 mass %, for example, ISOTON II (product name) manufactured by Beckman Coulter, Inc. may be used in the measurement. The dedicated software is set as described below prior to the measurement and the analysis.

In the “Change Standard Operating Method (SOM)” screen of the dedicated software, the total count number of a control mode is set to 50,000 particles, the number of times of measurement is set to 1, and a value obtained by using “standard particles each having a particle diameter of 10.0 μm” (manufactured by Beckman Coulter, Inc.) is set as a Kd value. A threshold and a noise level are automatically set by pressing a “Threshold/Measure Noise Level” button. In addition, a current is set to 1,600 μA, again is set to 2, and an electrolyte is set to ISOTON II (product name), and a check mark is placed in a check box “Flush Aperture Tube after Each Run.”

In the “Convert Pulses to Size Settings” screen of the dedicated software, a bin spacing is set to a logarithmic particle diameter, the number of particle diameter bins is set to 256, and a particle diameter range is set to the range of from 2 μm or more to 60 μm or less.

A specific measurement method is as described below.

(1) About 200 mL of the electrolyte aqueous solution is loaded into a 250 mL round-bottom beaker made of glass dedicated for Multisizer 3. The beaker is set in a sample stand, and the electrolyte aqueous solution in the beaker is stirred with a stirrer rod at 24 revolutions/sec in a counterclockwise direction. Then, dirt and bubbles in the aperture tube are removed by the “Flush Aperture” function of the analysis software.

(2) About 30 mL of the electrolyte aqueous solution is loaded into a 100 mL flat-bottom beaker made of glass. About 0.3 mL of a diluted solution prepared by diluting Contaminon N (product name) (10 mass % aqueous solution of a neutral detergent for washing a precision measuring device, manufactured by Wako Pure Chemical Industries, Ltd.) with ion-exchanged water by three mass fold is added to the electrolyte aqueous solution.

(3) An ultrasonic dispersing unit (product name: Ultrasonic Dispersion System Tetra 150, manufactured by Nikkaki Bios Co., Ltd.) in which two oscillators each having an oscillatory frequency of 50 kHz are built so as to be out of phase by 1800 and which has an electrical output of 120 W is prepared. A predetermined amount of ion-exchanged water and about 2 mL of Contaminon N (product name) are loaded into the water tank of the ultrasonic dispersing unit.

(4) The beaker in the section (2) is set in the beaker fixing hole of the ultrasonic dispersing unit, and the ultrasonic dispersing unit is operated. Then, the height position of the beaker is adjusted in order that the liquid surface of the electrolyte aqueous solution in the beaker may resonate with an ultrasonic wave from the ultrasonic dispersing unit to the fullest extent possible.

(5) About 10 mg of the toner (particles) are gradually added to and dispersed in the electrolyte aqueous solution in the beaker in the section (4) under a state in which the electrolyte aqueous solution is irradiated with the ultrasonic wave. Then, the ultrasonic dispersion treatment is further continued for 60 seconds. The temperature of water in the water tank is appropriately adjusted so as to be 10° C. or more and 40° C. or less at the time of the ultrasonic dispersion.

(6) The electrolyte aqueous solution in the section (5) in which the toner (particles) have been dispersed is dropped with a pipette to the round-bottom beaker in the section (1) placed in the sample stand, and the measurement concentration is adjusted so as to be about 5%. Then, measurement is performed until the particle diameters of 50,000 particles are measured.

(7) The measurement data is analyzed with the dedicated software attached to the apparatus, and the weight-average particle diameter (D4) of the particles is calculated. The "Average Diameter" on the "Analysis/Volume Statistics (Arithmetic Average)" screen of the dedicated software when the dedicated software is set to show a graph in a vol % unit is the weight-average particle diameter (D4). The "Average Diameter" on the "Analysis/Number Statistics (Arithmetic Average)" screen when the dedicated software is set to show a graph in a number % unit is the number-average particle diameter (D1) of the particles.

EXAMPLES

The present disclosure is more specifically described below by way of Production Examples and Examples. However, the present disclosure is by no means limited thereto. All the numbers of parts in the following blending refer to "part(s) by mass."

<Production Example of Inorganic Oxide Particle 1>

A mixed gas with a volume ratio of argon to oxygen of 3:1 was introduced into a reaction vessel to replace the atmosphere. Into this reaction vessel, an oxygen gas was supplied at 40 ($m^3$/hr) and a hydrogen gas was supplied at 20 ($m^3$/hr), followed by the formation of combustion flame formed of oxygen and hydrogen with an igniter. Then, metal silicon powder serving as a raw material was loaded into the combustion flame with a hydrogen carrier gas at a pressure of 147 kPa (1.5 kg/$cm^2$) to form a dust cloud. The dust cloud was ignited by the combustion flame to cause an oxidation reaction by dust explosion. After the oxidation reaction, the inside of the reaction vessel was cooled to provide inorganic oxide particle 1 having a number-average particle diameter of 2.68 μm (2,680 nm).

<Production Examples of Inorganic Oxide Particles 2 to 4, 6, 7, and 12>

The inorganic oxide particle 1 were pulverized with a pulverizer (manufactured by Hosokawa Micron Corporation) while the number of revolutions, screen size, and number of passes of the pulverizer were adjusted. Thus, inorganic oxide particle 2 having a number-average particle diameter of 1.54 μm (1,540 nm) were obtained. In addition, the inorganic oxide particle 1 was pulverized with the pulverizer while the number of revolutions, screen size, and number of passes of the pulverizer were adjusted. Thus, inorganic oxide particles 3, 4, 6, 7, and 12 were obtained. The number-average particle diameters of the resultant inorganic oxide particles are shown in Table 1.

<Production Example of Inorganic Oxide Particle 5>

A mixed gas with a volume ratio of argon to oxygen of 3:1 was introduced into a reaction vessel to replace the atmosphere. Into this reaction vessel, an oxygen gas was supplied at 40 ($m^3$/hr) and a hydrogen gas was supplied at 20 ($m^3$/hr), followed by the formation of combustion flame formed of oxygen and hydrogen with an igniter. Then, metal silicon powder serving as a raw material was loaded into the combustion flame with a hydrogen carrier gas at a pressure of 0.5 kg/$cm^3$ to form a dust cloud. The dust cloud was ignited by the combustion flame to cause an oxidation reaction by dust explosion. After the oxidation reaction, the inside of the reaction vessel was cooled to provide silica powder having a number-average particle diameter of 3.44 μm.

The silica powder was pulverized with a pulverizer while the number of revolutions, screen size, and number of passes of the pulverizer were adjusted. Thus, silica particles 5 were obtained. The number-average particle diameter of the resultant inorganic oxide particles is shown in Table 1.

<Production Example of Inorganic Oxide Particle 8>

Ilmenite ore was dried, pulverized, and treated with concentrated sulfuric acid to be subjected to digestion/extraction. After the unreacted ore was removed, iron sulfate was de-crystallized. A sodium hydroxide aqueous solution was added to the resultant titanyl sulfate to adjust its pH to 9.0, followed by desulfurization. After that, the resultant was neutralized to a pH of 5.8 with hydrochloric acid, and filtered and washed with water. After calcination in a heating furnace, the resultant was pulverized with a pulverizer while the number of revolutions, screen size, and number of passes of the pulverizer were adjusted. Thus, titanium oxide serving as inorganic oxide particle 8 was obtained. The number-average particle diameter of the resultant inorganic oxide particles is shown in Table 1.

<Production Example of Inorganic Oxide Particle 9>

Magnesium oxide powder (PYROKISUMA 3320, manufactured by Kyowa Chemical Industry Co., Ltd.) was pulverized with a pulverizer while the number of revolutions, screen size, and number of passes of the pulverizer were adjusted. Thus, magnesium oxide particles serving as inorganic oxide particle 9 were obtained. The number-average particle diameter of the resultant inorganic oxide particles is shown in Table 1.

<Production Example of Inorganic Oxide Particle 10>

Aluminum oxide was refined by a Bayer process through use of bauxite as a raw material. Sodium hydroxide was added to bauxite, and was dissolved therein by heating at 250° C. After an insoluble content was removed by filtration, aluminum hydroxide was collected as a solid by cooling. This aluminum hydroxide was heated and dehydrated at 1,050° C. to provide aluminum oxide. Next, the resultant was pulverized with a pulverizer while the number of revolutions, screen size, and number of passes of the pulverizer were adjusted. Thus, aluminum oxide particles serving as inorganic oxide particle 10 were obtained. The number-average particle diameter of the resultant inorganic oxide particles is shown in Table 1.

<Production Example of Inorganic Oxide Particle 11>

Ilmenite ore was dried, pulverized, and treated with concentrated sulfuric acid to be subjected to digestion/extraction. After the unreacted ore was removed, iron sulfate was de-crystallized. A sodium hydroxide aqueous solution was added to the resultant titanyl sulfate to adjust its pH to 9.0, followed by desulfurization. After that, the resultant was neutralized to a pH of 5.8 with hydrochloric acid, and filtered and washed with water. Water was added to the washed cake to form a 1.5 mol/L slurry as $TiO_2$, and then hydrochloric acid was added to the slurry to adjust its pH to 1.5, and the resultant was deflocculated. The desulfurized and deflocculated metatitanic acid was collected as $TiO_2$ and loaded into a 3 L reaction vessel. A strontium chloride aqueous solution was added to the deflocculated metatitanic acid slurry so that the molar ratio of $SrO/TiO_2$ became 1.18, and then the concentration of $TiO_2$ was adjusted to 0.9 mol/L.

Next, the resultant was heated to 90° C. under stirring and mixing. Then, 444 mL of a 10 N sodium hydroxide aqueous solution was added to the resultant over 50 minutes while microbubbling of a nitrogen gas was performed at 600 ml/min. After that, stirring was performed at 95° C. for 1 hour while microbubbling of a nitrogen gas was performed at 400 ml/min. Then, the reaction slurry was rapidly cooled to 12° C. under stirring while cooling water at 10° C. was caused to flow to a jacket of the reaction vessel. The slurry was neutralized by adding hydrochloric acid, and was stirred for 1 hour, followed by filtration and separation. After calcination in a heating furnace, the resultant was pulverized with a pulverizer while the number of revolutions, screen size, and number of passes of the pulverizer were adjusted. Thus, strontium titanate serving as inorganic oxide particle 11 was obtained. The number-average particle diameter of the resultant inorganic oxide particles is shown in Table 1.

TABLE 1

| | Number-average particle diameter (μm) |
|---|---|
| Inorganic oxide particle 1 | 2.68 |
| Inorganic oxide particle 2 | 1.54 |
| Inorganic oxide particle 3 | 0.82 |
| Inorganic oxide particle 4 | 0.46 |
| Inorganic oxide particle 5 | 2.80 |
| Inorganic oxide particle 6 | 1.66 |
| Inorganic oxide particle 7 | 1.59 |
| Inorganic oxide particle 8 | 0.52 |
| Inorganic oxide particle 9 | 0.52 |
| Inorganic oxide particle 10 | 0.51 |
| Inorganic oxide particle 11 | 0.61 |
| Inorganic oxide particle 12 | 0.26 |

<Production Example of Toner 1>

Binding resin A: 80.0 parts (styrene-acrylic resin having a mass ratio between styrene and n-butyl acrylate of 78:22; Mw=180,000, Tg=58° C.)

Binding resin B: 20.0 parts (styrene-acrylic resin having a mass ratio between styrene and n-butyl acrylate of 78:22; Mw=5,300, Tg=58° C.)

Paraffin wax (HNP-9, Nippon Seiro Co., Ltd.): 5.0 parts

Inorganic oxide particle 2: 2.0 parts

Aluminum 3,5-di-t-butylsalicylate compound: 0.5 part

Carbon black: 5.0 parts

The above-mentioned materials were mixed with a Henschel mixer (model FM-75, manufactured by Mitsui Mining Co., Ltd.) at a number of revolutions of 20 $s^{-1}$ for a rotation time of 5 min, and then kneaded with a twin-screw kneader (model PCM-30, manufactured by Ikegai Corp.) set at a temperature of 130° C. The resultant kneaded product was cooled to 25° C. and coarsely pulverized with a hammer mill to 1 mm or less, to thereby provide a coarsely pulverized product. The resultant coarsely pulverized product was finely pulverized with a mechanical pulverizer (T-250, manufactured by Turbo Kogyo Co., Ltd.). The resultant was classified with a multi-division classifier utilizing the Coanda effect to provide toner base particles 1 having a weight-average particle diameter (D4) of 9.0 μm.

2.0 Parts of hydrophobic silica fine particles (surface-treated with 15 mass % of hexamethyldisilazane, number-average particle diameter of primary particles: 50 nm) were added to 100 parts of the resultant toner base particles 1, and the particles were mixed with a Henschel mixer (model FM-75, manufactured by Mitsui Mining Co., Ltd.) at a number of revolutions of 30 $s^{-1}$ and a rotation time of 10 min. Thus, the inorganic particles were caused to adhere to the surface of each of the toner base particles.

Next, treatment was performed with a surface treatment apparatus using hot air illustrated in FIG. 2. The surface treatment was performed under the conditions at the time of surface modification of a raw material supply speed of 1.0 kg/hr. a hot air flow rate of 1.4 $m^3$/min, a hot air discharge temperature of 180° C., a cold air temperature of 3° C., a cold air flow rate of 1.2 $m^3$/min, and an absolute moisture content of 3.0 g/$m^3$.

Next, fine powder and coarse powder were simultaneously classified and removed with an air classifier ("Elbow-Jet Labo EJ-L-3", manufactured by Nittetsu Mining Co., Ltd.) utilizing the Coanda effect to provide toner particles 1.

Next, 100.0 parts of the toner particles 1 and 2.0 parts of hydrophobic silica fine particles (silica particles RY 200, manufactured by Nippon Aerosil Co., Ltd.) were loaded into a Henschel mixer (model FM-75, manufactured by Mitsui Miike Kakoki K.K.). Mixing was performed under a temperature of 30° C. by setting the peripheral speed of a rotating blade to 35 m/sec and a mixing time to 8 minutes. Thus, a toner 1 was obtained through a sieve having an opening of 45 μm. The formulation of the toner 1 is shown in Table 2, and the physical properties thereof are shown in Table 3.

<Production Examples of Toners 2, 5 to 10, and 15 to 18>

Toners 2, 5 to 10, and 15 to 18 were each obtained in the same manner as in the production example of the toner 1 except that inorganic oxide particles shown in Table 2 were used. The formulations of the toners 2, 5 to 10, and 15 to 18 are shown in Table 2, and the physical properties thereof are shown in Table 3.

<Production Example of Toner 3>

A toner 3 was obtained in the same manner as in the production example of the toner 1 except that the hot air discharge temperature at the time of the surface treatment of the toner particles each having the inorganic particles adhering to its surface with the hot air was changed to 120° C. The formulation of the toner 3 is shown in Table 2, and the physical properties thereof are shown in Table 3.

<Production Example of Toner 4>

A toner 4 was obtained in the same manner as in the production example of the toner 1 except that the hot air discharge temperature at the time of the surface treatment of the toner particles each having the inorganic particles adhering to its surface with the hot air was changed to 100° C. The formulation of the toner 4 is shown in Table 2, and the physical properties thereof are shown in Table 3.

<Production Examples of Toners 11 and 12>

Toners 11 and 12 were each obtained in the same manner as in the production example of the toner 1 except that the addition amount of the external additive was changed as shown in Table 2. The formulations of the toners 11 and 12 are shown in Table 2, and the physical properties thereof are shown in Table 3.

<Production Example of Toner 13>

A toner 13 was obtained in the same manner as in the production example of the toner 1 except that the binding resins were changed to 100.0 parts of a binding resin C ([polyoxypropylene(2.2)-2,2-bis(4-hydroxyphenyl)propane: polyoxyethylene(2.2)-2,2-bis(4-hydroxyphenyl)propane:terephthalic acid:trimellitic acid=80:20:85:15]) as shown in Table 2. The formulation of the toner 13 is shown in Table 2, and the physical properties thereof are shown in Table 3.

<Production Example of Toner 14>

A toner 14 was obtained in the same manner as in the production example of the toner 1 except that the binding resins were changed to 100.0 parts of the binding resin A as shown in Table 2. The formulation of the toner 14 is shown in Table 2, and the physical properties thereof are shown in Table 3.

<Production Examples of Toners 19 and 20>

Toners 19 and 20 were each obtained in the same manner as in the production example of the toner 1 except that inorganic oxide particles shown in Table 2 were used. The formulations of the toners 19 and 20 are shown in Table 2, and the physical properties thereof are shown in Table 3.

<Production Example of Toner 21>

100.0 Parts of the toner base particles 1 obtained in the production example of the toner 1 and 2.0 parts of hydrophobic silica fine particles (silica particles RY 200, manufactured by Nippon Aerosil Co., Ltd.) were loaded into a Henschel mixer (model FM-75, manufactured by Mitsui Miike Kakoki K.K.). Mixing was performed under a temperature of 30° C. by setting the peripheral speed of a rotating blade to 35 m/sec and a mixing time to 8 minutes. Thus, a toner 21 was obtained through a sieve having an opening of 45 µm.

The formulation of the toner 21 is shown in Table 2, and the physical properties thereof are shown in Table 3.

TABLE 2

| | Binding resin | | | | Inorganic oxide particle | | External additive | |
|---|---|---|---|---|---|---|---|---|
| Toner No. | Kind | Number of parts | Kind | Number of parts | Kind | Number of parts | Kind | Number of parts |
| Toner 1 | A | 80 | B | 20 | 2 | 2.0 | RY200 | 2.0 |
| Toner 2 | A | 80 | B | 20 | 2 | 1.5 | RY200 | 2.0 |
| Toner 3 | A | 80 | B | 20 | 2 | 2.0 | RY200 | 2.0 |
| Toner 4 | A | 80 | B | 20 | 2 | 2.0 | RY200 | 2.0 |
| Toner 5 | A | 80 | B | 20 | 3 | 2.0 | RY200 | 2.0 |
| Toner 6 | A | 80 | B | 20 | 4 | 2.0 | RY200 | 2.0 |
| Toner 7 | A | 80 | B | 20 | 5 | 2.0 | RY200 | 2.0 |
| Toner 8 | A | 80 | B | 20 | 1 | 2.5 | RY200 | 2.0 |
| Toner 9 | A | 80 | B | 20 | 6 | 2.5 | RY200 | 2.0 |
| Toner 10 | A | 80 | B | 20 | 7 | 2.5 | RY200 | 2.0 |
| Toner 11 | A | 80 | B | 20 | 1 | 2.0 | RY200 | 1.5 |
| Toner 12 | A | 80 | B | 20 | 1 | 2.0 | RY200 | 1.0 |
| Toner 13 | C | 100 | — | — | 1 | 2.0 | RY200 | 2.0 |
| Toner 14 | A | 100 | — | — | 1 | 2.0 | RY200 | 2.0 |
| Toner 15 | A | 80 | B | 20 | 8 | 2.0 | RY200 | 2.0 |
| Toner 16 | A | 80 | B | 20 | 9 | 2.0 | RY200 | 2.0 |
| Toner 17 | A | 80 | B | 20 | 10 | 2.0 | RY200 | 2.0 |
| Toner 18 | A | 80 | B | 20 | 11 | 2.0 | RY200 | 2.0 |
| Toner 19 | A | 80 | B | 20 | 2 | 0.8 | RY200 | 2.0 |
| Toner 20 | A | 80 | B | 20 | 12 | 1.5 | RY200 | 2.0 |
| Toner 21 | A | 80 | B | 20 | 3 | 2.0 | RY200 | 2.0 |

TABLE 3

| | | | | | | | Toner | | | | |
|---|---|---|---|---|---|---|---|---|---|---|---|
| | Inorganic oxide particle | | | | | | | | Coating | | |
| Toner No. | Component | Long diameter (nm) | Pointed portion | SF-1 | Ratio of Sm/St (%) | Standard deviation of Sm | Particle diameter D4 (µm) | Average circularity | ratio of external additive (%) | Binding resin | Peak or shoulder of Mw |
| Toner 1 | $SiO_2$ | 1,550 | Present | 150 | 9.1 | 0.70 | 9.0 | 0.980 | 85 | St-Ac | 5,300/180,000 |
| Toner 2 | $SiO_2$ | 1,530 | Present | 150 | 4.1 | 0.65 | 8.9 | 0.981 | 85 | St-Ac | 5,300/180,000 |
| Toner 3 | $SiO_2$ | 1,540 | Present | 150 | 9.0 | 0.69 | 8.8 | 0.961 | 85 | St-Ac | 5,300/180,000 |
| Toner 4 | $SiO_2$ | 1,520 | Present | 150 | 8.9 | 0.69 | 8.9 | 0.952 | 85 | St-Ac | 5,300/180,000 |
| Toner 5 | $SiO_2$ | 800 | Present | 155 | 9.0 | 0.52 | 8.9 | 0.978 | 85 | St-Ac | 5,300/180,000 |
| Toner 6 | $SiO_2$ | 450 | Present | 153 | 7.8 | 0.42 | 8.8 | 0.979 | 85 | St-Ac | 5.300/180,000 |
| Toner 7 | $SiO_2$ | 2,810 | Present | 155 | 8.7 | 0.71 | 9.0 | 0.981 | 85 | St-Ac | 5,300/180,000 |
| Toner 8 | $SiO_2$ | 2,670 | Present | 135 | 9.5 | 0.46 | 8.8 | 0.982 | 85 | St-Ac | 5,300/180,000 |
| Toner 9 | $SiO_2$ | 1,650 | Present | 145 | 9.4 | 0.52 | 8.9 | 0.978 | 85 | St-Ac | 5,300/180,000 |
| Toner 10 | $SiO_2$ | 1,580 | Absent | 138 | 9.5 | 0.48 | 9.1 | 0.979 | 85 | St-Ac | 5,300/180,000 |
| Toner 11 | $SiO_2$ | 1,520 | Present | 150 | 9.3 | 0.70 | 9.0 | 0.980 | 78 | St-Ac | 5,300/180,000 |
| Toner 12 | $SiO_2$ | 1,550 | Present | 150 | 9.4 | 0.70 | 9.1 | 0.981 | 70 | St-Ac | 5,300/180,000 |

TABLE 3-continued

| | Inorganic oxide particle | | | | | | Toner | | | | |
|---|---|---|---|---|---|---|---|---|---|---|---|
| | | | | | | | | | Coating | | |
| Toner No. | Component | Long diameter (nm) | Pointed portion | SF-1 | Ratio of Sm/St (%) | Standard deviation of Sm | Particle diameter D4 (μm) | Average circularity | ratio of external additive (%) | Binding resin | Peak or shoulder of Mw |
| Toner 13 | $SiO_2$ | 1,530 | Present | 150 | 9.2 | 0.70 | 8.9 | 0.977 | 85 | PES | 53,000 |
| Toner 14 | $SiO_2$ | 1,540 | Present | 150 | 9.1 | 0.70 | 8.8 | 0.975 | 85 | St-Ac | 180,000 |
| Toner 15 | $TiO_2$ | 500 | Present | 135 | 7.9 | 0.50 | 8.8 | 0.981 | 85 | St-Ac | 5,300/180,000 |
| Toner 16 | MgO | 510 | Present | 132 | 8.0 | 0.51 | 8.9 | 0.982 | 85 | St-Ac | 5,300/180,000 |
| Toner 17 | $Al_2O_3$ | 520 | Present | 130 | 8.1 | 0.52 | 9.0 | 0.979 | 85 | St-Ac | 5,300/180,000 |
| Toner 18 | $SrTiO_3$ | 600 | Present | 138 | 8.2 | 0.53 | 9.0 | 0.980 | 85 | St-Ac | 5,300/180,000 |
| Toner 19 | $SiO_2$ | 1,550 | Present | 150 | 2.8 | 0.41 | 8.9 | 0.981 | 85 | St-Ac | 5,300/180,000 |
| Toner 20 | $SiO_2$ | 250 | Present | 145 | 8.0 | 0.30 | 8.8 | 0.979 | 85 | St-Ac | 5,300/180,000 |
| Toner 21 | $SiO_2$ | 450 | Present | 130 | 4.2 | 0.41 | 9.0 | 0.945 | 85 | St-Ac | 5,300/180,000 |

Examples 1 to 18 and Comparative Examples 1 to 3

Evaluation tests of the toners 1 to 18 for Examples and the toners 19 to 21 for Comparative Examples were each performed in the following manner.

<Evaluation of Transferability>

A toner was loaded into a cartridge (CF230X) for a printer (LaserJet Pro m203dw) manufactured by Hewlett-Packard Company adopting a cleaner-less system, and was evaluated for its transferability under a low-temperature and low-humidity environment (15.0° C., 10.0% RH).

A transparent pressure-sensitive adhesive tape made of polyester (product name: polyester tape No. 5511, supplied by Nichiban Co., Ltd.) was applied to a transfer residual toner on an electrostatic latent image-bearing member (photosensitive member) at the time of solid image formation when a transfer current was adjusted to 8.0 μA, and the pressure-sensitive adhesive tape was stripped off. A density difference obtained by subtracting a density in the case of applying the stripped-off pressure-sensitive adhesive tape onto paper from a density in the case of applying only the pressure-sensitive adhesive tape onto the paper was calculated for each of the toners.

The densities were measured through use of REFLECTOMETER MODEL TC-6DS manufactured by Tokyo Denshoku Co., Ltd. A green filter was used as a filter.

The evaluation was performed at the following timings: an initial stage; a stage after passage of 3,500 sheets: and a stage after passage of 7,000 sheets.

The determination criteria are as described below. Ranks C or more are determined to be satisfactory. The results are shown in Table 4.

A: The density difference is less than 5.0, which is significantly satisfactory.

B: The density difference is 5.0 or more and less than 10.0, which is satisfactory.

C: The density difference is 10.0 or more and less than 15.0.

D: The density difference is 15.0 or more.

<Evaluation of Cleaning Property>

In the same manner as in the evaluation of transferability, the evaluation of a cleaning property was performed under a low-temperature and low-humidity environment (15.0° C., 10.0% RH) by loading a toner into a cartridge (CF230X) for a printer (LaserJet Pro m203dw) manufactured by Hewlett-Packard Company.

Figure 3:
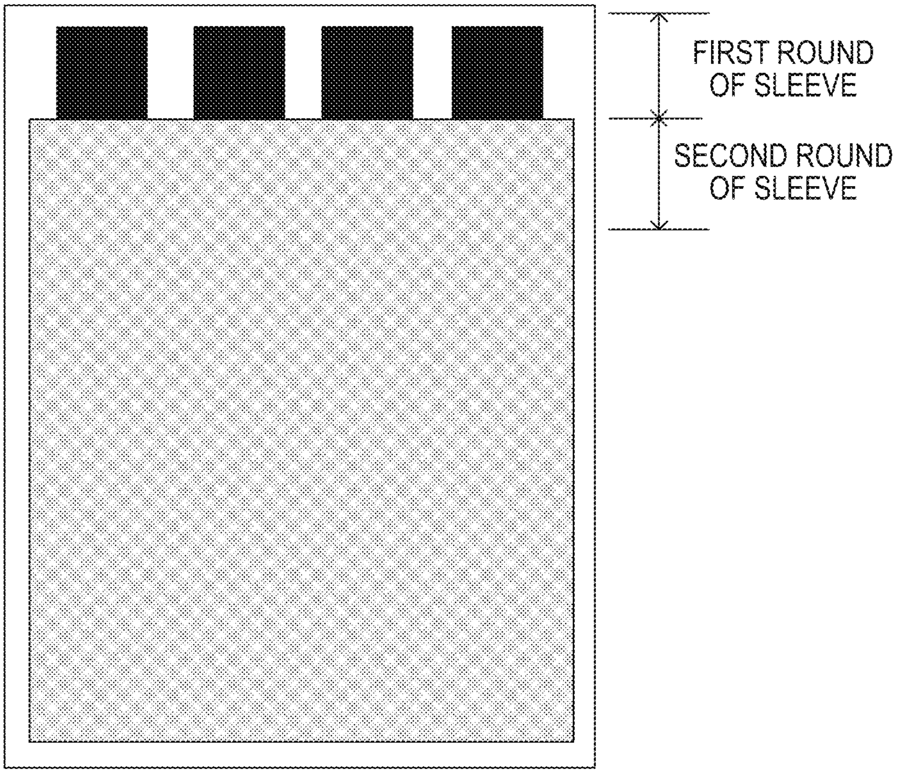
FIG. 3 is an evaluation image of a cleaning property.

Such an image including block-shaped solid black images in a first round of a developing sleeve and a halftone full surface solid image formed under the solid black images as illustrated in FIG. 3 was printed. Then, the visual evaluation of the image was performed to determine how much of the history of the images in the first round of the developing sleeve appeared in the halftone image after the second round of the developing sleeve.

The evaluation was performed at the following timings: a stage after passage of 2,000 sheets; a stage after passage of 3,500 sheets: and a stage after passage of 7,000 sheets.

The determination criteria are as described below. Ranks C or more are determined to be satisfactory. The results are shown in Table 4.

A: No difference in density is observed.

B: A slight difference in density is observed.

C: A difference in density is observed.

D: A difference in density is observed even after the third round of the developing sleeve.

Figure 4:
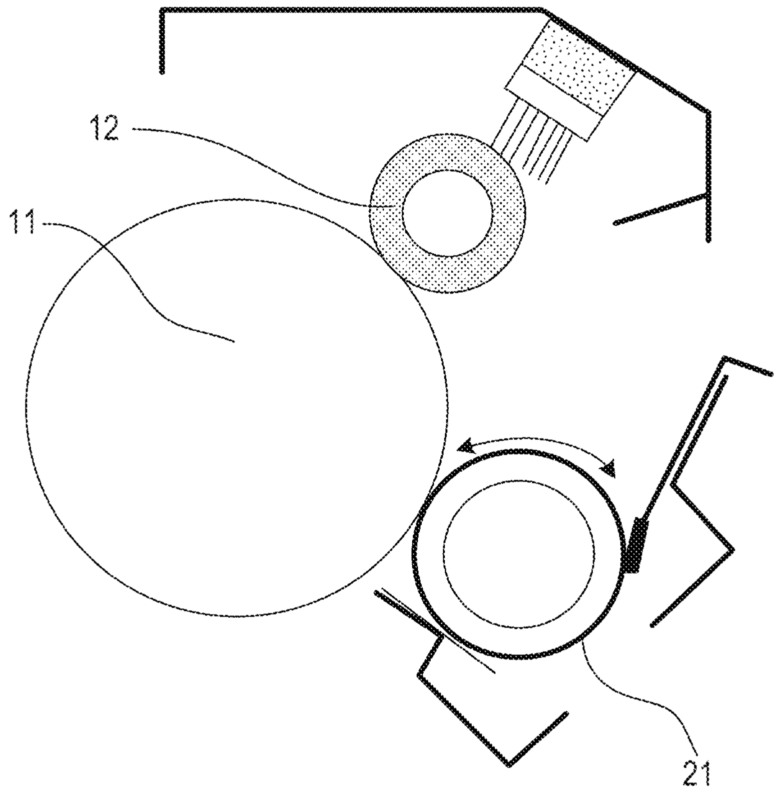
FIG. 4 is a schematic sectional view of a process cartridge.

In the cleaner-less system, as in FIG. 4 that is a view for schematically illustrating a process cartridge of a printer, the entire toner remaining on a photosensitive drum 11 without being transferred onto paper owing to the absence of a cleaning member of a photosensitive member reaches a charging roller 12. Most of the toner remaining on the photosensitive drum 11 is negatively charged by rubbing against the charging roller 12, and is collected by a developing sleeve 21 without adhering to the charging roller 12. However, when the contamination of the charging roller advances in the latter half of the endurance, the transfer residual toner that has reached the charging roller is not sufficiently negatively charged. In addition, a difference in electric charge between the photosensitive member and the developing sleeve becomes difficult to be caused. As a result, the transfer residual toner cannot be collected by the developing sleeve and appears as a ghost image after the second round of the developing sleeve.

Meanwhile, the inventors have conceived that, through use of the toner having the rolling property suppressed of the present disclosure, the transfer residual toner can b collected by the developing sleeve also in the cleaner-less system even in the latter half of the endurance in which it is difficult to collect the toner by the developing sleeve as described above, and a satisfactory image is obtained.

TABLE 4

| | Toner No. | Transferability: Initial stage | Transferability: Stage after passage of 3,500 sheets | Transferability: Stage after passage of 7,000 sheets | Cleaning property: Stage after passage of 2,000 sheets | Cleaning property: Stage after passage of 3,500 sheets | Cleaning property: Stage after passage of 7,000 sheets |
|---|---|---|---|---|---|---|---|
| Example 1 | Toner 1 | A | A | A | A | A | A |
| Example 2 | Toner 2 | A | A | A | B | B | B |
| Example 3 | Toner 3 | B | B | C | A | A | A |
| Example 4 | Toner 4 | B | C | C | A | A | A |
| Example 5 | Toner 5 | A | A | A | B | B | C |
| Example 6 | Toner 6 | A | A | A | C | C | C |
| Example 7 | Toner 7 | A | A | B | A | A | B |
| Example 8 | Toner 8 | A | A | A | C | C | C |
| Example 9 | Toner 9 | A | A | A | B | B | B |
| Example 10 | Toner 10 | A | A | A | B | C | C |
| Example 11 | Toner 11 | B | B | B | A | A | B |
| Example 12 | Toner 12 | B | B | C | A | B | C |
| Example 13 | Toner 13 | A | A | C | A | B | C |
| Example 14 | Toner 14 | A | A | C | A | B | C |
| Example 15 | Toner 15 | A | A | A | B | C | C |
| Example 16 | Toner 16 | A | A | A | B | C | C |
| Example 17 | Toner 17 | A | A | A | B | C | C |
| Example 18 | Toner 18 | A | A | A | B | C | C |
| Comparative Example 1 | Toner 19 | A | A | A | C | C | D |
| Comparative Example 2 | Toner 20 | A | A | A | C | C | D |
| Comparative Example 3 | Toner 21 | D | D | D | C | C | C |

According to the present disclosure, both the transferability and cleaning property of the toner can be achieved at a high level when the speed of an electrophotographic apparatus is increased and the life thereof is extended.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-028817, filed Feb. 28, 2022, which is hereby incorporated by reference herein in its entirety.

What is claimed is:

1. A toner comprising:

a toner particle containing a binding resin, and an inorganic oxide particle, wherein the inorganic oxide particle is a particle of an oxide containing at least one element selected from the group consisting of: Si; Mg; Al; Ti; and Sr, wherein, when an area of the inorganic oxide particle is represented by Sm and a sectional area of the toner is represented by St in a cross-section of the toner observed with a transmission electron microscope, Sm/St is 4.0% or more, wherein an area Sm of the inorganic oxide particle that occupies each of four regions obtained by dividing the cross-section of the toner by a long diameter of the toner and a perpendicular bisector of the long diameter has a standard deviation of 0.40 or more in the observed cross-section, and wherein the toner has an average circularity of 0.950 or more.

2. The toner according to claim 1, wherein the inorganic oxide particle has a long diameter of 400 to 3,000 nm in the observed cross-section.

3. The toner according to claim 1, wherein the inorganic oxide particle includes a pointed portion in the observed cross-section.

4. The toner according to claim 1, wherein the inorganic oxide particle has a long diameter of 750 to 3,000 nm in the observed cross-section.

5. The toner according to claim 1, wherein the area Sm of the inorganic oxide particle has a standard deviation of 0.50 or more in the observed cross-section.

6. The toner according to claim 1, wherein the inorganic oxide particle is a silica particle.

7. The toner according to claim 1, wherein the inorganic oxide particle has a shape factor SF-1 of 140 or more in the observed cross-section.

8. The toner according to claim 1, wherein the toner has an average circularity of 0.960 or more.

9. The toner according to claim 1, wherein the toner further comprises an external additive, and wherein the external additive has a coating ratio of 75% or more.

10. The toner according to claim 1, wherein the binding resin is a styrene-acrylic resin.

11. The toner according to claim 1, wherein the binding resin is a styrene-acrylic resin, and wherein two or more of peaks or shoulders are present in a range of a weight-average molecular weight Mw of 3,000 to 2,000,000 in a molecular weight distribution of a tetrahydrofuran soluble component of the binding resin.

12. A toner production method for producing a toner including a toner particle containing a binding resin and an inorganic oxide particle, the production method comprising obtaining the toner particle, wherein the obtaining the toner particle includes obtaining a pre-hot-air surface treatment toner particle and subjecting the pre-hot-air surface treatment toner particle to surface treatment with hot air, wherein the obtaining a pre-hot-air surface treatment toner particle includes melting and kneading the binding resin and the inorganic oxide particle, wherein the inorganic oxide particle is a particle of an oxide containing at least one element selected from the group consisting of: Si; Mg; Al; Ti; and Sr, wherein, when an area of the inorganic oxide particle is represented by Sm and a sectional area of the toner is represented by St in a cross-section of the toner observed with a transmission electron microscope, Sm/St is 4.0% or more, wherein an area Sm of the inorganic oxide particle that occupies each of four regions obtained by dividing the cross-section of the toner by a long diameter of the toner and a perpendicular bisector of the long diameter has a standard deviation of 0.40 or more in the observed cross-section, and wherein the toner has an average circularity of 0.950 or more.

13. The toner production method according to claim 12, wherein the inorganic oxide particle includes a pointed portion in the observed cross-section.

14. The toner production method according to claim 12, wherein the inorganic oxide particle has a shape factor SF-1 of 140 or more in the observed cross-section.

* * * * *